United States Patent
Marshall et al.

(10) Patent No.: US 6,443,594 B1
(45) Date of Patent: Sep. 3, 2002

(54) ONE-PIECE LENS ARRAYS FOR COLLIMATING AND FOCUSING LIGHT AND LED LIGHT GENERATORS USING SAME

(75) Inventors: Thomas M. Marshall, Hartsdale, NY (US); Gerard Harbers, S'Hertogenbosch (NL); Michael D. Pashley, Cortland Manor; Stephen Herman, Monsey, both of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/540,390

(22) Filed: Mar. 31, 2000

(51) Int. Cl.⁷ .................................. F21V 5/04
(52) U.S. Cl. ................ 362/244; 362/236; 362/237; 362/241
(58) Field of Search .................. 362/800, 545, 362/227, 235, 236, 237, 240, 241, 242, 243, 244, 245, 509, 511, 520

(56) References Cited

U.S. PATENT DOCUMENTS

| | | | | | |
|---|---|---|---|---|---|
| 4,862,330 A | * | 8/1989 | Machida et al. | ............ | 362/522 |
| 4,935,665 A | * | 6/1990 | Murata | ........................ | 313/500 |
| 4,951,179 A | * | 8/1990 | Machida | ..................... | 362/522 |
| 5,093,768 A | * | 3/1992 | Ohe | ............................ | 362/241 |
| 5,241,457 A | * | 8/1993 | Sasajima et al. | ............. | 362/503 |
| 5,490,049 A | * | 2/1996 | Montalan et al. | ........... | 362/240 |
| 5,515,253 A | * | 5/1996 | Sjobom | ....................... | 362/244 |
| 5,806,969 A | * | 9/1998 | Rosengren | ................... | 362/235 |
| 5,833,355 A | * | 11/1998 | You et al. | .................... | 362/244 |

FOREIGN PATENT DOCUMENTS

| | | | | |
|---|---|---|---|---|
| DE | 19646042 | 5/1998 | ............ | B60Q/1/26 |
| EP | 0821254 A1 | 1/1998 | ............ | G02B/6/42 |
| JP | 07135393 A | 5/1995 | ........... | H01L/27/15 |

\* cited by examiner

*Primary Examiner*—Sandra O'Shea
*Assistant Examiner*—Ismael Negron

(57) ABSTRACT

A lens array for a lamp directs light to a light conduit such as an optical fiber or light pipe for guiding light to a remote location. An array of LED serve as light sources. The lens array includes an integrally formed member having a number of collimator lenses positioned in the lens array so that each lens can operate as a collimator for a corresponding LED to produce a respective collimated beam of light. The lenses have optical properties that are optimized according to where their corresponding LED are positioned in the LED array, so that the lens array is provided with lens prescriptions that produce refraction of the collimated beams of light toward an entrance aperture of the light conduit.

22 Claims, 4 Drawing Sheets

ONE-PIECE LENS ARRAYS FOR COLLIMATING AND FOCUSING LIGHT AND LED LIGHT GENERATORS USING SAME

RELATED APPLICATIONS

Commonly-assigned, Netherlands application, Ser. No. PHN 17 233, filed Dec. 17, 1998, and Netherlands application, Ser. No. PHN 17607, filed Sep. 19, 1999 both relate to light generators having one-piece lens arrays for collimating light.

FIELD OF THE INVENTION

This invention relates to lenses used for collimating and focusing light in LED light generators and in particular, to one-piece lens arrays for collimating and focusing light and LED light generators that use such lens arrays.

BACKGROUND AND SUMMARY OF THE INVENTION

Present LED light generator designs collect light from an array of separate LED sources, and focus the light at a target, such as the entrance aperture of an optical fiber. A critical aspect in most of these designs is the collimation and focusing of the separate LED sources in order to create a useable light beam.

Many LED light generator designs employ a plurality of separate and distinct primary optical elements (collimators) each of which efficiently captures the widely divergent light generated by a respective one of the LED sources. For practical reasons, the collimators are identical, and thus have parallel optic axes which produce collimated light beams which are parallel to one another. A second lens (collection lens) focuses the parallel collimated light beams at the desired target. The second lens must have relatively high-angle refraction to focus the light beams generated by the LED sources at the periphery of the array.

The use of a separate and distinct collimator for each LED source of the array undesirably increases the size, complexity and cost of the light generator design. This is because the collimators must be individually mounted and aligned using bulky mounting hardware and spacers that require expensive handling and alignment steps during assembly.

Additionally, the high-angle refraction of the collection lens reduces total collection efficiency due to Presnel loss and beam spreading at the higher refraction angles.

Accordingly, lenses which collimate and/or focus light in LED light generators are needed that reduce handling and alignment during light generator assembly and allow more compact light generator packaging with substantially identical optical function.

In one aspect of the invention, a lens array for a lamp directs light to a light conduit such as an optical fiber or light pipe for guiding light to a remote location. An array of LED serve as light sources. The lens array includes an integrally formed member having a number of collimator lenses positioned in the lens array so that each lens can operate as a collimator for a corresponding LED to produce a respective collimated beam of light. The lenses have optical properties that are optimized according to where their corresponding LED are positioned in the LED array, so that the lens array is provided with lens prescriptions that produce refraction of the collimated beams of light toward an entrance aperture of the light conduit.

In another aspect of the invention, a light generator for a lamp uses an array of LED as light sources. Each LED generates diverging light. An integrally formed member defines a number of collimator lenses positioned in a lens array so that each of the lenses operates to collimate the diverging light generated by corresponding one of the LED into a respective collimated light beam. The lenses have optical properties that are optimized according to where their corresponding LED are positioned in the LED array. A collection lens is used for focusing the collimated light beams at an entrance aperture of a light conduit such as an optical fiber or light pipe.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not to scale.

DETAILED DESCRIPTION

Figure 1:
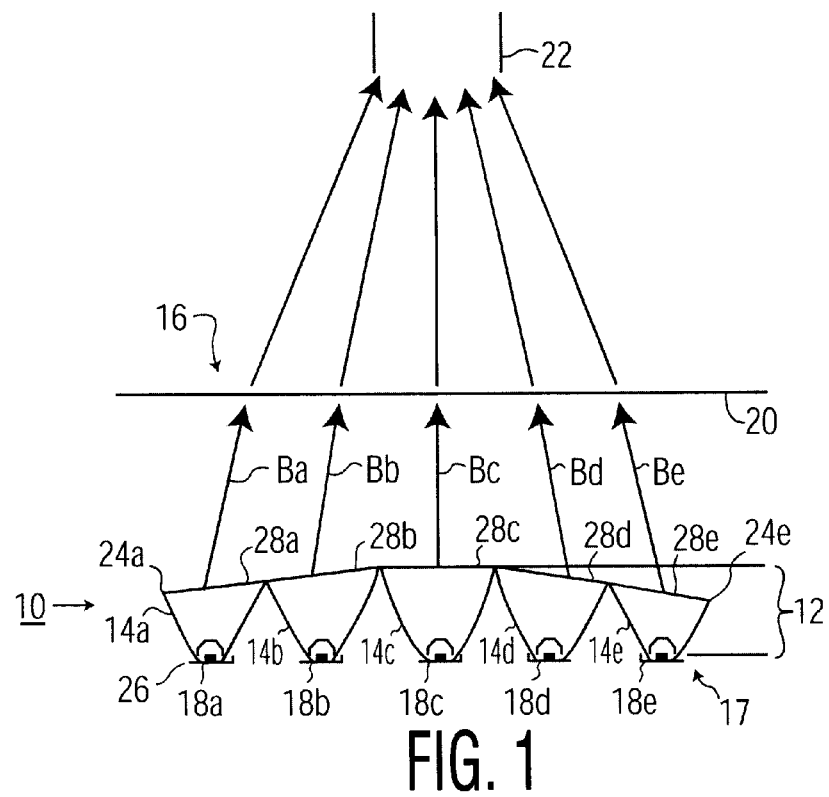
FIG. 1 is a diagrammatic view of a lens array according to an embodiment of the invention as used in a typical light emitting diode (LED) light generator.

FIG. 1 is a diagrammatic view showing a lens array 10 according to a first embodiment of the invention as used in a typical light emitting diode (LED) light generator 16 comprises of an array 17 of LED sources 18a through 18e. The lens array 10 integrates a plurality of collimator lenses 14a through 14e into a single unitarily formed member 12 which can be inexpensively manufactured from plastic using known conventional optical plastic molding methods. The lenses 14a through 14e are positioned in the array 10 in a predetermined manner so that each LED source 18a through 18e has its own collimator. Each lens 14a through 14e this array 10 is optically optimized according to where its corresponding LED source 18a through 18e is positioned in the LED array 17. A planar collection lens 20 such as a Fresnel lens, is provided after the lens array 10 for focusing the light beams Ba through Be at a desired target 22 such as the entrance apertures of a light conduit such as an optical fiber or light pipe of a signage or illumination system. The collection lens 20 has a lens prescription that is selected to permit it to operate effectively with the optically optimized lenses 14a through 14e of the lens array 10.

As stated earlier, each lens 14a through 14e of the array 10 is optically optimized for the positioning of its corresponding LED source 18 in the LED array 17. For example, the lenses 14a through 14a located at the periphery 24a and 24e of the lens array 10 which collimate the LED sources 18a through 18e located at the periphery 26 of the LED array 17 is provided with their own specific lens prescriptions. Such a lens prescription can define a refractive surface 28a through 28e that enables the lens 14a through 14e to refract or "steer" the collimated beam Ba through Be of light partially toward the selected target 22. Because the lenses 14a through 14e are an integral molded one-piece member, virtually no additional manufacturing costs will be incurred as the individual lens prescriptions can be easily provided in the plastic molding tooling. Accordingly, the inventive lens array 10 permits the use of a variety of LED packages, size requirements, total-lumen requirements, etc. The data provided further on shows the results of a simplified calculation that illustrates this principle.

The ability to optically optimize each individual lens 14a through 14e in the lens array 10 by providing them with their own specific lens prescription advantageously permits variable spacing of the LED sources 18 in an LED light generator 16. This is important for the following reason. For all designs, there is a tradeoff between the collimator's efficiency and its size. A smaller collimator is less efficient, but it improves the collection lens efficiency, since the focusing angle is smaller (larger collimators are more efficient but increase the focusing angle because they can be farther from the central axis of the light generator). Restated, there is a tradeoff between collimator efficiency and collection lens efficiency. In conventional light generator designs, the collimator efficiency (i.e., size of the collimator lens) decision can only be made once, globally, for all the LED sources. However, the collimator efficiency of each lens 14a through 14e of the lens array 10 of the present invention, can be specifically matched (a prescription which varies the "size" of the lens 14) for the position of its corresponding LED source 18. Since the collection efficiency of the collection lens 20 varies across its radius, matching can be accomplished by inversely varying the collimator efficiency of the of the lenses 14 of the array 10 according to how its corresponding LED source 18 is positioned relative to the collection lens 20. Hence, the use of the lens array 10 of the present invention can lead to higher total LED light generator efficiency. For example, the lenses 14a through 14e at the periphery 24a through 24e of the lens array 10 can have lens prescriptions that call for an increased exit aperture size. This would provide more collimation of light at the periphery of the lens array 10 thereby matching the lower collection efficiency at the periphery of the collection lens 20.

Other advantages are realized with the lens array 10 of the invention. For instance, the lens array 10 also reduces the light generator's 16 manufacturing cost because it requires substantially less handling and alignment during assembly as compared to conventional separate collimator lens elements. Additionally, the inventive lens array 10 permits a more compact light generator design with substantially the same optical function as larger conventional designs, because the mounting lips and spacers associated with conventional separate collimator lens elements are not needed.

The collection lens 20 used with the lens arrays 10 that have lenses with "beam steering" lens prescriptions require modification to operate effectively with the lens array 10. The lens array 10 depicted in FIG. 1 provides only a small amount beam steering thus the curvature of the collection lens 20 can be modified from that of a simple spherical lens in order to more efficiently refract the "steered" beams B of the light from the lens array 10.

Figure 2:
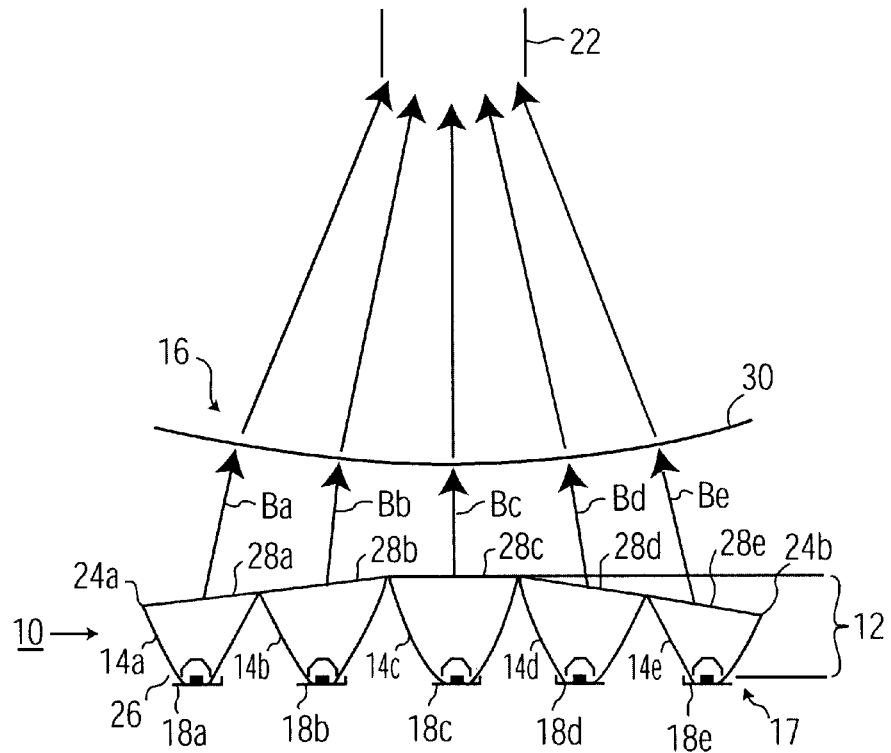
FIG. 2 is a diagrammatic view of an LED light generator having a collection lens especially adapted for use with the lens array of the invention.

When the lenses 14a through 14e of the lens array 10 are provided with optical prescriptions that produce a substantial amount of beam steering, the collection lens can be constructed as a curved one-piece array 30 of Fresnel lenses as shown in FIG. 2. Because the collection lens 30 is single unitarily formed member it can also be inexpensively manufactured from plastic using known conventional optical plastic molding methods. In addition, the Fresnel lenses of the collection lens array 30 can have different focal lengths. The collection lens 30 can also include other modifications which optimize light gathering.

As should now be apparent, the lens array 10 of the invention has two separate advantages. The first is cost. The single unitarily formed member part is less expensive to manufacture than the many parts that it replaces in conventional light generator designs. The second advantage is performance. The integration permits a more complex optical design at virtually no additional manufacturing cost, leading to improved light collection as the lens array 10 collimates and also partially steers the light towards the light generator exit aperture and the collection lens then completes the task of focusing. By splitting the refraction angle burden between two elements, the total efficiency is improved.

As mentioned earlier, a simplified calculation was performed to demonstrate the higher performance of the inventive lens array 10. The calculation was performed using an optical ray-tracing program known as ASAP™. The calculation was performed for a conventional light generator lens system with a non-beam steering collimator (reference system), and a light generator lens system using a beam steering lens array of the present invention (improved system).

Figure 3A:
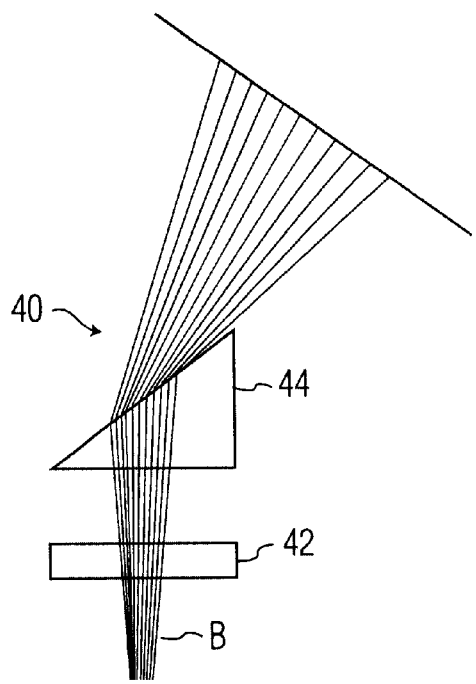
FIG. 3A is a diagrammatic view of a reference system that was used in a calculation performed with an optical ray-tracing program to illustrate the performance of a conventional lens system used in a typical LED light generator.
Figure 3B:
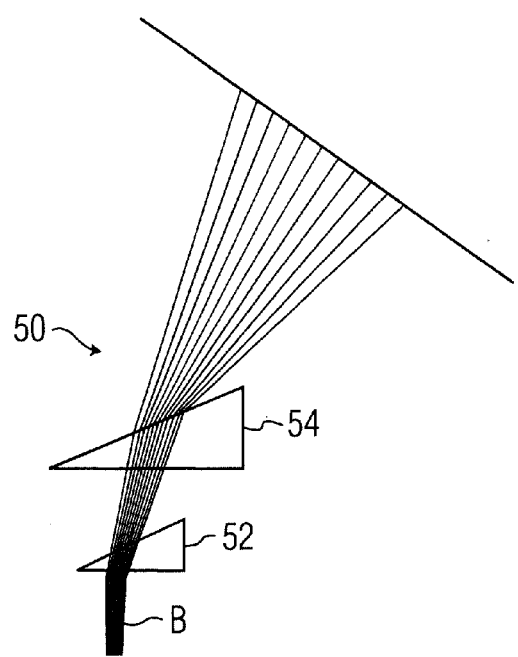
FIG. 3B is a diagrammatic view of a system that was used in a calculation performed with an optical ray-tracing program to illustrate the performance of the lens system of the invention.

As depicted in FIG. 3A the reference system 40 used a parallel plate 42 and single wedge 44 to deflect the beam B. The improved system 50 depicted in FIG. 3B used two wedges 52, 54. All plates and wedges had an index of refraction of 1.5. The wedge and total refraction angles were chosen arbitrarily, and there was no particular significance to the specific values other than convenience. The results are a general feature of the comparison between using one wedge and two wedges for beam deflection. The parallel plate was included to represent a collimator with no steering function, but the Fresnel losses of its two surfaces were included to approximate the reference collimator Fresnel loss. The single wedge of the reference system had an angle of 39.53°, resulting in a total refraction angle of 33.18°. The two wedges of the improved system each had an angle of 25°, which also resulted in a total refraction angle of 33.18°. All wedges had their entrance surfaces perpendicular to the initial beam direction. Again, this is for computational convenience only, and does not represent any essential feature of the calculation.

The results of the calculations show that the improved system was superior in two ways. First, where the reference system transmitted only 64% of the input beam (a truncated Lambertian of cone angle 2×4°), the improved system transmitted about 80%, or 25% more light than the reference system (i.e. 80/64=1.25). The second advantage is a bit subtler, but of comparable importance. The beam exiting the reference system was broader (and therefore of a lower intensity per unit of total flux) than the improved system beam. The numerical value of the advantage that this represents depends on the specific geometry of the application, but the magnitude of the broadening can be at least quantified.

Figure 4A:
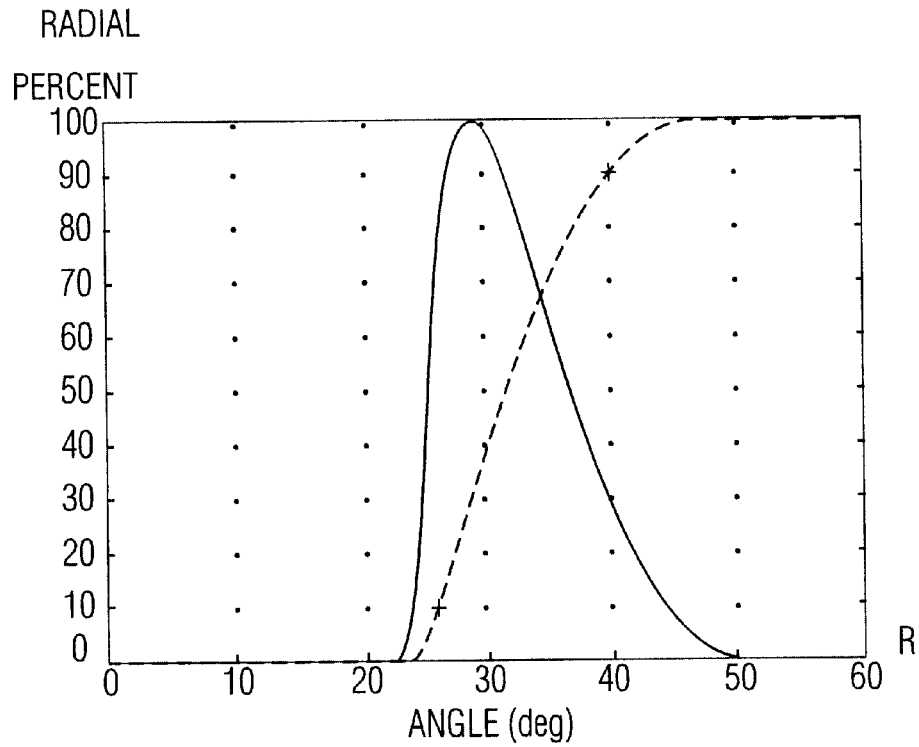
FIG. 4A is a graphical illustration of the angular distributions and integral distributions for the reference system.
Figure 4B:
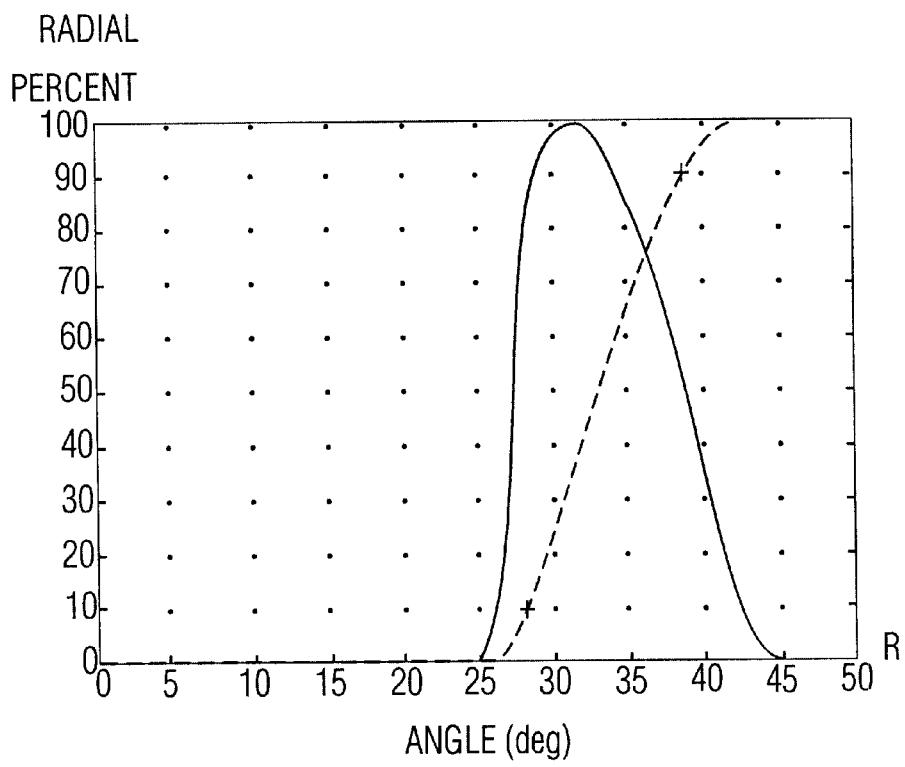
FIG. 4B is a graphical illustration of the angular distributions and integral distributions for the improved system.
Figure 5:
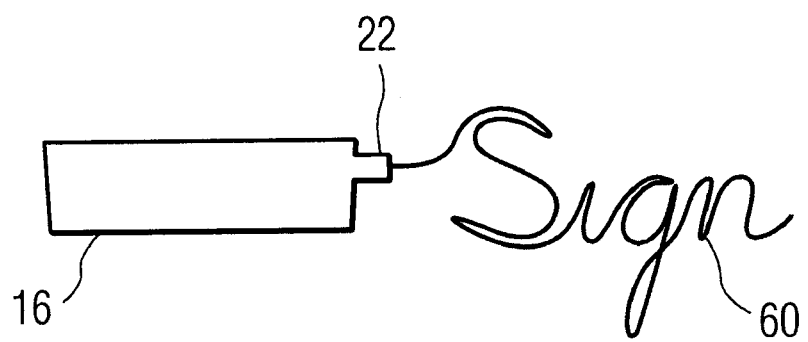
FIG. 5 is a schematic diagram of an LED light generating system of the invention including a light pipe extended into a signage configuration.

Since both beams were broadened asymmetrically, with the asymmetry being much worse for the reference system, the integral of the total flux is considered, and the angle from the 10% point to the 90% point (i.e. the central 80% of the beam) is measured. Those angles were 13.7° and 10.4° for the reference and improved systems respectively. Graphics of the angular distributions and integral distributions for the reference system and the improved system are shown in FIGS. 4A and 4B, with cursors ("+") marking the range of measurement on the integral distributions.

While the foregoing invention has been described with reference to the above embodiments, various modifications and changes can be made without departing from the spirit of the invention. Accordingly, all such modifications and changes are considered to be within the scope of the appended claims.

What is claimed is:

1. A lens array for a lamp using a light conduit such as an optical fiber or light pipe for guiding light to a remote location, and an array of LED as light sources, the lens array comprising an integrally formed member having a plurality of collimator lenses, the lenses positioned in the lens array so that each lens can operate as a collimator for a corresponding LED to produce a respective collimated beam of light, the lenses having optical properties which are optimized according to where their corresponding LED are positioned in the LED array, wherein the lens array is provided with lens prescriptions that produce refraction of the collimated beams of light toward an entrance aperture of the light conduit.

2. The lens array of claim 1, wherein each of the lens prescriptions defines a refractive surface thait refracts an associated collimated beam of light toward the entrance aperture of the light conduit.

3. The lens array of claim 1, wherein the lens prescription also provides the one or more lenses with their own selected collimating characteristics.

4. The lens array of claim 1, wherein the one or more lenses are located at a periphery of the lens array.

5. The lens array of claim 4, wherein the lens prescription also provides the one or more lenses with their own selected collimating characteristics.

6. The lens array of claim 1, wherein one or more of the lenses of the lens array are provided with lens prescriptions which provide the one or more lenses with their own selected collimating characteristics.

7. The lens array of claim 6, wherein the one or more lenses are located at a periphery of the lens array.

8. A light emitting diode (LED) light generator for a lamp using a light conduit such as an optical fiber or light pipe, comprising:

an array of LED as light sources, each LED generating diverging light;

an integrally formed member defining a plurality of collimator lenses positioned in a lens array so that each of the lenses operates to collimate the diverging light generated by a corresponding one of the LED into a respective collimated light beam, the lenses having optical properties which are optimized according to where their corresponding LED are positioned in the LED array; and a collection lens for focusing the collimated light beams at an entrance aperture of the light conduit.

9. The light generator of claim 8, wherein the collection lens is a planar member with Fresnel lenses.

10. The light generator of claim 8, wherein the collection lens is a unitarily formed curved member with Fresnel lenses.

11. A lighting system for signage and illumination applications, the system comprising an optical fiber for guiding light to a predetermined location, and the light generator of claim 8, wherein the optical fiber includes an entrance aperture which forms the predetermined target of the light generator.

12. The light generator of claim 8, wherein one or more of the lenses of the lens array are provided with lens prescriptions which provide the one or more lenses with their own selected collimating characteristics.

13. The light generator of claim 12, wherein the one or more lenses are located at a periphery of the lens array.

14. The light generator of claim 8, wherein one or more of the lenses of the lens array are provided with lens prescriptions that produce refraction of the collimated light beams toward the entrance aperture of the light conduit.

15. The light generator of claim 14, wherein each of the lens prescriptions defines a refractive surface that refracts an associated collimated beam of light toward the entrance aperture of the light conduit.

16. The light generator of claim 14, wherein the collection lens is a planar member with Fresnel lenses.

17. The light generator of claim 14, wherein the collection lens is a unitarily formed curved member with Fresnel lenses.

18. The light generator of claim 14, wherein the one or more lenses are located at a periphery of the lens array.

19. The light generator of claim 18, wherein the lens prescription also provides the one or more lenses with their own selected collimating characteristics.

20. The light generator of claim 14, wherein the lens prescription also provides the one or more lenses with their own selected collimating characteristics.

21. The light generator of claim 20, wherein the collection lens is a planar member with Fresnel lenses.

22. The light generator of claim 20, wherein the collection lens is a unitarily formed curved member with Fresnel lenses.

* * * * *